United States Patent [19]
Lemelson et al.

[11] Patent Number: 5,945,656
[45] Date of Patent: Aug. 31, 1999

[54] APPARATUS AND METHOD FOR STAND-ALONE SCANNING AND AUDIO GENERATION FROM PRINTED MATERIAL

[76] Inventors: Jerome H. Lemelson, Suite 286, Unit 802, 930 Tahoe Blvd., Incline Village, Nev. 89451-9436; Dennis M. Intravia, 84 Pacific St., Massapequa Park, N.Y. 11762; John H. Hiett, 1060 W. Boulder La., Flagstaff, Ariz. 86001

[21] Appl. No.: 08/863,924

[22] Filed: May 27, 1997

[51] Int. Cl.$^6$ ...................................................... G06K 7/10
[52] U.S. Cl. ........................... 235/462.01; 235/472.01; 235/472.03; 434/308; 434/178
[58] Field of Search ..................... 235/462.01, 462.2, 235/472.01, 472.03, 375, 462.45, 462.49; 250/227.13; 382/313; 434/319, 308, 317, 312, 178, 185; 273/237; 463/44

[56] References Cited

U.S. PATENT DOCUMENTS

| | | | |
|---|---|---|---|
| 3,189,889 | 6/1965 | Bridgett | 340/324 |
| 3,292,489 | 12/1966 | Johnson et al. | 88/24 |
| 3,406,387 | 10/1968 | Werme | 340/324 |
| 3,859,632 | 1/1975 | Etter | 340/146.3 |
| 3,911,270 | 10/1975 | Traub | 250/227 |
| 3,918,029 | 11/1975 | Lemelson | 235/61.11 |
| 3,937,558 | 2/1976 | Mukai et al. | 350/96 B |
| 3,944,740 | 3/1976 | Murase et al. | 178/18 |
| 3,949,233 | 4/1976 | Gluck | 250/555 |
| 4,042,792 | 8/1977 | Pakenham et al. | 179/90 R |
| 4,053,765 | 10/1977 | Kuffer | 250/227 |
| 4,091,270 | 5/1978 | Musch et al. | 235/462 |
| 4,101,072 | 7/1978 | Weaver et al. | 235/455 |
| 4,104,603 | 8/1978 | Wheeler et al. | 335/306 |
| 4,107,540 | 8/1978 | Hillman | 250/566 |
| 4,109,146 | 8/1978 | Hillman | 250/227 |
| 4,146,782 | 3/1979 | Barnich | 235/472 |
| 4,176,273 | 11/1979 | Fujie et al. | 219/220 |
| 4,182,956 | 1/1980 | Funk, Jr. et al. | 250/239 |
| 4,196,845 | 4/1980 | Chesters | 235/462 |
| 4,329,684 | 5/1982 | Monteath et al. | 340/707 |
| 4,337,375 | 6/1982 | Freeman | 179/1 SA |
| 4,392,053 | 7/1983 | Bockholt | 235/472 |
| 4,431,870 | 2/1984 | May et al. | 179/81 C |
| 4,471,218 | 9/1984 | Culp | 235/472 |
| 4,540,176 | 9/1985 | Baer | 273/148 B |
| 4,570,250 | 2/1986 | Gabritsos et al. | 369/97 |
| 4,575,627 | 3/1986 | Pease et al. | 250/227 |
| 4,588,881 | 5/1986 | Pejas et al. | 235/385 |
| 4,602,152 | 7/1986 | Dittakavi | 235/463 |
| 4,604,065 | 8/1986 | Frazer et al. | 434/331 |
| 4,642,459 | 2/1987 | Caswell et al. | 250/227 |
| 4,677,428 | 6/1987 | Bartholow | 340/708 |
| 4,681,548 | 7/1987 | Lemelson | 434/311 |
| 4,682,016 | 7/1987 | Inoue | 235/462 |
| 4,695,831 | 9/1987 | Shinn | 340/707 |

(List continued on next page.)

*Primary Examiner*—Donald Hajec
*Assistant Examiner*—Diane I. Lee
*Attorney, Agent, or Firm*—Louis J. Hoffman; William J. Hallihan

[57] ABSTRACT

A self-contained, hand-held, portable code reading and processing system within an elongated tubular housing forms a wand that transduces coded data into selected speech or music. A simple-to-use reading and processing system can be used as part of a learning and activity game. In one form, a scanning guide is hingedly attached to a book. When the guide is folded over a page of the book, a path is created across the coded data to enable children and others to easily scan the coded data with the hand-held wand. A contact switch at or near the scanning end of the system is actuated by the scanning guide to activate the code reading and processing system. An energy-saving power shutdown feature turns off the code reading and processing system when no coded data are scanned in a given time period. The contact switch and the automatic power shutdown system act in concert as a safety system to prevent small children from staring at the light source for prolonged periods of time. Audio data may be provided in the form of a removable memory cartridge, to allow use of the system in a variety of applications.

49 Claims, 4 Drawing Sheets

U.S. PATENT DOCUMENTS

| | | | |
|---|---|---|---|
| 4,705,942 | 11/1987 | Budrikis et al. | 250/227 |
| 4,748,318 | 5/1988 | Bearden et al. | 235/472 |
| 4,789,836 | 12/1988 | May | 328/117 |
| 4,800,257 | 1/1989 | Johner | 235/472 |
| 4,891,011 | 1/1990 | Cook | 434/157 |
| 4,964,167 | 10/1990 | Kunizawa et al. | 381/52 |
| 4,988,186 | 1/1991 | Hill et al. | 351/239 |
| 4,991,091 | 2/1991 | Allen | 364/413.02 |
| 5,003,472 | 3/1991 | Perrill et al. | 364/401 |
| 5,065,003 | 11/1991 | Wakatsuki et al. | 235/472 |
| 5,081,342 | 1/1992 | Knowles et al. | 235/436 |
| 5,081,527 | 1/1992 | Naito | 358/75 |
| 5,142,131 | 8/1992 | Collins, Jr. et al. | 235/472 |
| 5,177,800 | 1/1993 | Coats | 381/52 |
| 5,181,521 | 1/1993 | Lemelson | 128/736 |
| 5,276,272 | 1/1994 | Masuda | 84/600 |
| 5,314,336 | 5/1994 | Diamond et al. | 235/462 |
| 5,406,063 | 4/1995 | Jelen | 235/472 |
| 5,406,491 | 4/1995 | Lima | 364/449 |
| 5,424,524 | 6/1995 | Ruppert et al. | 235/462 |
| 5,483,052 | 1/1996 | Smith, III et al. | 235/472 |
| 5,506,394 | 4/1996 | Plesko | 235/472 |
| 5,515,347 | 5/1996 | Mulder et al. | 369/30 |

APPARATUS AND METHOD FOR STAND-ALONE SCANNING AND AUDIO GENERATION FROM PRINTED MATERIAL

FIELD OF THE INVENTION

This invention relates to self-contained, portable, hand-held, beam canning devices or stand-alone magnetic pick-up scanning devices that convert coded data or indicia to select speech or other audio output, for use with a book or other printed material, and associated methods.

BACKGROUND OF THE INVENTION

Data scanning, data collection and data processing devices for scanning optically encoded or magnetic encoded information are well known. Examples of such devices are described in U.S. Pat. Nos. 5,506,394; 5,515,347; 5,506,394; 5,483,052; 5,424,524; 5,406,063; 5,406,491; 5,276,272; 5,142,131; 5,081,527; 5,081,342; 5,065,003; 5,003,472; 4,991,091; 4,988,186; 4,800,257; 4,789,836; 4,705,942; 4,748,318; 4,695,831; 4,682,016; 4,677,428; 4,642,459; 4,604,065; 4,588,881; 4,575,627; 4,540,176; 4,471,218; 4,431,870; 4,392,053; 4,337,375; 4,329,684; 4,196,845; 4,182,956; 4,176,273; 4,146,782; 4,109,146; 4,107,540; 4,104,603; 4,101,072; 4,053,765; 4,042,792; 3,949,233; 3,944,740; 3,937,558; 3,918,029; 3,911,270; 3,859,632; 3,735,350; 3,710,078; 3,406,387; 3,292,489; and 3,189,889, each of which is incorporated herein by reference.

In a perfect world, parents spend numerous hours interacting with their children and read to them daily. Unfortunately, due to the increasing frequency of single-parent and two-income families, the amount of time available for parents to interact with their children is reduced. Children are not read to as frequently, and often television acts as a modern-day babysitter while parents are busy with various activities. Young children spend less time in interactive activities that use and challenge their imaginations.

Although many homes contain numerous books, such books are often not designed for people who cannot read, such as a young child to use by themselves. Young children can only achieve maximum benefit from most text-containing books when someone has the time and is willing to read them. Young children, who cannot read, often attempt to use regular books by themselves, but they often become bored by looking at the pictures and trying to remember the story that had previously been read to them.

In a like manner, much written material is not very useful for people who cannot read, have problems reading, or cannot read a specific language. For example, dyslexics, illiterates, international travelers, immigrants, and others often have difficulty with written material. There is, therefore, a need for a reading system that is simple, inexpensive, and easy even for a child to operate.

SUMMARY OF THE INVENTION

It is a primary object of this invention to provide a new and improved electronic communication system and method for use by children, the handicapped, illiterates, immigrants, international travelers, and others.

Another object of the invention is to provide an improved system and method for electronically reading a book by providing an electrical reading apparatus that is easily handled and can be operated by a small child.

Another object of the invention is to provide an improved system and method for optically reading a book by providing an optical reading apparatus that is easily handled and can be operated by a small child.

Another object of the invention is to provide an improved system and method for reading coded information and generating sounds associated with the coded information in a hand-held and portable device.

Another object of the invention is to provide an improved system and method for allowing a child or a handicapped person to derive intelligible information from a book through the use of a hand-held electronic apparatus.

Another object of the invention is to provide an improved system and method for conserving energy in an electronic code reading system.

Another object of the invention is to provide an improved system and method for safely operating a light source in an electro-optical reading system, by preventing the light source from being accidently left in an activated condition.

The above and other objects of the invention as may be apparent from a review of the detailed description below are achieved through the provision of a stand-alone, hand-held code scanning-reading apparatus that is pen-like in shape and of a size such that a young child can easily grip and operate it as a scanner. A stand-alone electrical device reads printed information and transduces the printed information to audio sounds such as select speech or music.

In a preferred embodiment, a guide path on a book-type device permits proper scanning of coded information by the code scanner-reader apparatus. A switch at the scanning end of the code scanner-reader is actuated by contact with the surface being scanned.

In a particular form, the code scanner-reader includes an electro-optical reading system, decoder, microcontroller, memory, speech synthesizer, and speaker, all contained within a single, hand-held housing. Preferably, the code scanner-reader apparatus is pen-like in shape and size so that even a young child can easily grip and operate it.

In a preferred form, coded data, such as bar codes or even printed words, are arranged on sheets of paper or pages of a book, such as printed along the edges of a page of a book. A flat template having a cut-out portion, is attached to the cover of the book and can be folded or caused to extend over a page containing bar codes or other scannable indicia. The template may also be provide with a clip designed to be clipped to the cover of a book or another surface. The cut-out portion of the template allows access to the coded information and provides a guide for the code scanner-reader device so that a young child can properly scan the coded information.

The code scanner-reader apparatus is employed to generate coded electrical signals as the end of the electro-optical reading device is manually guided along the cut-out in the template and across selected indicia. The codes generated or derived from processing the signals are employed to activate and selectively control a synthetic speech signal generating circuit or computer to generate speech signals, which can be stored in a buffer memory or applied directly to an amplifier and speaker as they are generated, to produce sounds of words, music or other readily intelligible sounds associated with the coded information.

In one form, the code scanner-reader is positioned within the guide, and the edge or side-walls thereof or the surface scanned press against and close a pressure-activated or spring-actuated, normally open switch to activate the device. This switch allows a child to easily operate the scanning apparatus, as it is automatically turned on when the pen is pressed against a surface, as in scanning. This switch also acts to conserve the battery when the device is not in use. When the device includes an optical scanning system having a light source, the pressure-activated switch also prevents a child from optical damage by staring at the scanning light for extended periods of time.

By incorporating all of the electronic circuitry—including the scanning system, the sound or speech signal memory, the signal processing and analyzing electronics, the signal-conversion electronics, a battery, and the speaker—in a single, lightweight, hand-held, pen-shaped housing, with the speaker located near the end of the housing near an ear of the user, a code scanner-reader device results that is simple to use, easy to listen to, and does not require substantial power to generate a level of sound intelligible to the user.

The present invention has additional uses, such as verifying the information defined by a bar code or other coded indicia. A person scanning a bar code can listen to the words of speech defining the information being scanned to verbally indicate and verify the data scanned. It can be used, for example, by retail stores to prevent customers from switching merchandise tags and thus prices. When the code is scanned, the cashier can easily verify that the tag belongs to a particular garment, for example.

Other aspects of the invention will be appreciated by those skilled in the art after a reading of the detailed disclosure of the present invention below.

BRIEF DESCRIPTION OF THE DRAWINGS

Common numerals are used in the several figures to indicate corresponding elements.

DETAILED DESCRIPTION

Figure 1:
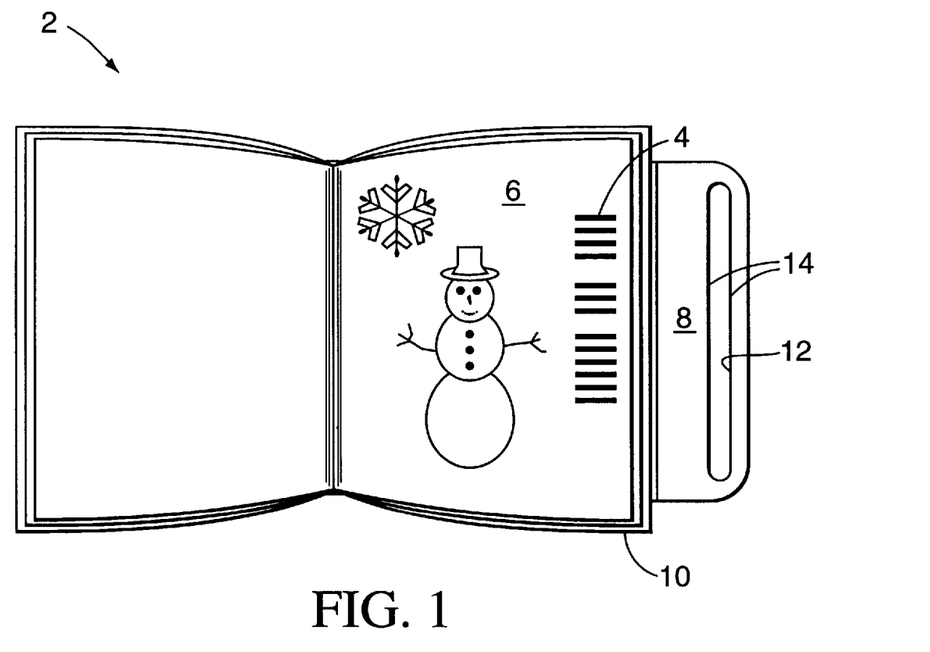
FIG. 1 is a plan view of an open book having bar codes on the open page and a scanning guide or template attached to the cover of the book.

FIG. 1 discloses printed material, such as book 2, that has scannable indicia printed on one or more of its pages, such as a bar code 4 printed on a page (numbered 6). The scannable indicia may be printed on a surface in a variety of ways including conventional printing using inks or paints, burning or heating selected areas of a surface or a chemical placed on the surface, removing selected material from a surface to expose the underlying material, chemically altering a selected portions of a surface to change its reflective or magnetic properties, or any other method of creating indicia perceptible to a scanning device.

Figure 2:
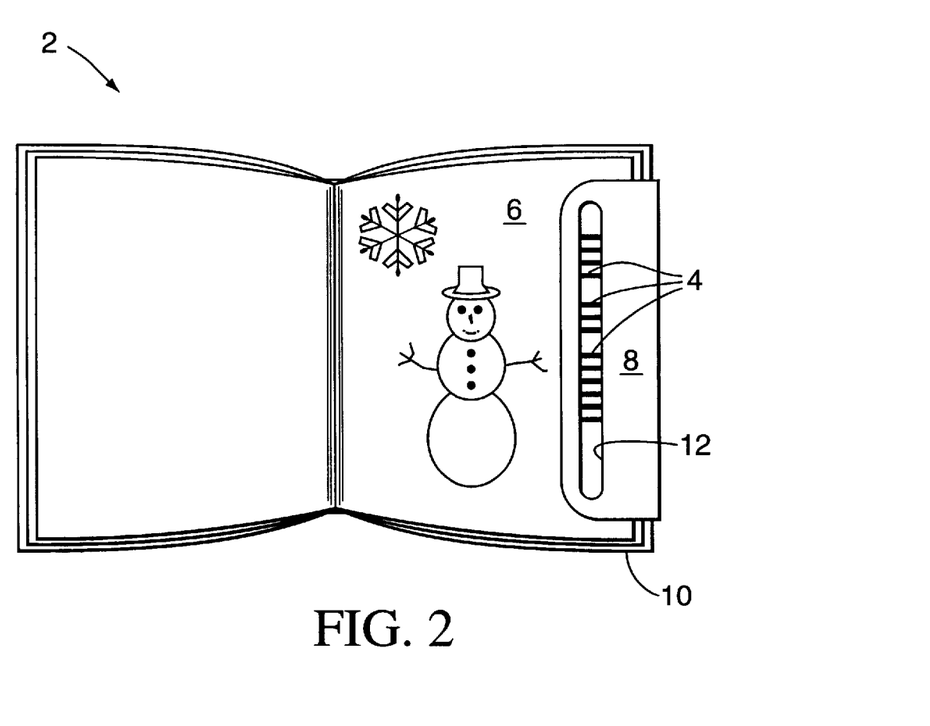
FIG. 2 is a plan view of the open book of FIG. 1 with the scanning guide folded over the bar codes on the open page.
Figure 4:
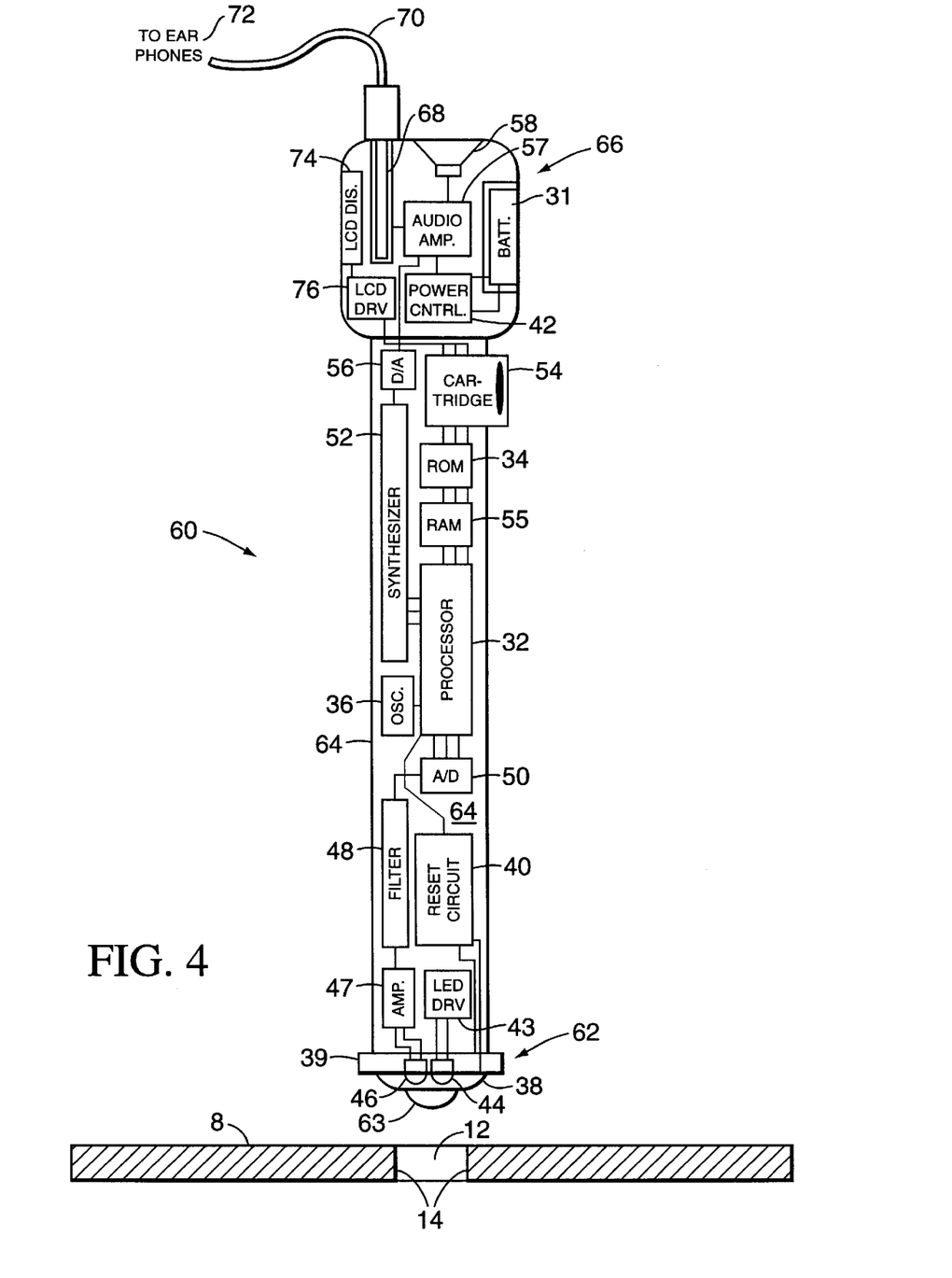
FIG. 4 is a side view of a stand-alone code scanner-reader incorporating the embodiment of FIG. 3.

In a preferred form, bar code 4 is printed along an edge of a page (as shown in FIG. 1) so that it does not interfere with any pictures or written text on the page. In an alternative form, multiple rows or columns of bar coded information can be printed, or otherwise placed or formed on the page. A guide 8 is configured so that it can extend or fold over the edge of an open page of the book 2. In one form, guide 8 is attached to the cover 10 of the book and may be folded over each page. In another form, a clip-on version of guide 8 is provided, which can be clipped onto a page or to the cover of the book. Guide 8 is formed of an appropriate material, such as plastic, metal, or cardboard. At least one slot or cut-out 12 is provided in guide 8 to allow access to the coded information on the page. In a preferred form, guide 8 is of sufficient thickness to permit the edges 14 of cut-out 12 to close a normally open pressure switch 38, as shown in FIG. 4 and described below. When guide 8 is positioned over the edge of a page (as shown in FIG. 2) cut-out 12 extends across the bar code 4, leaving the bar code at least partially uncovered.

Figure 3:
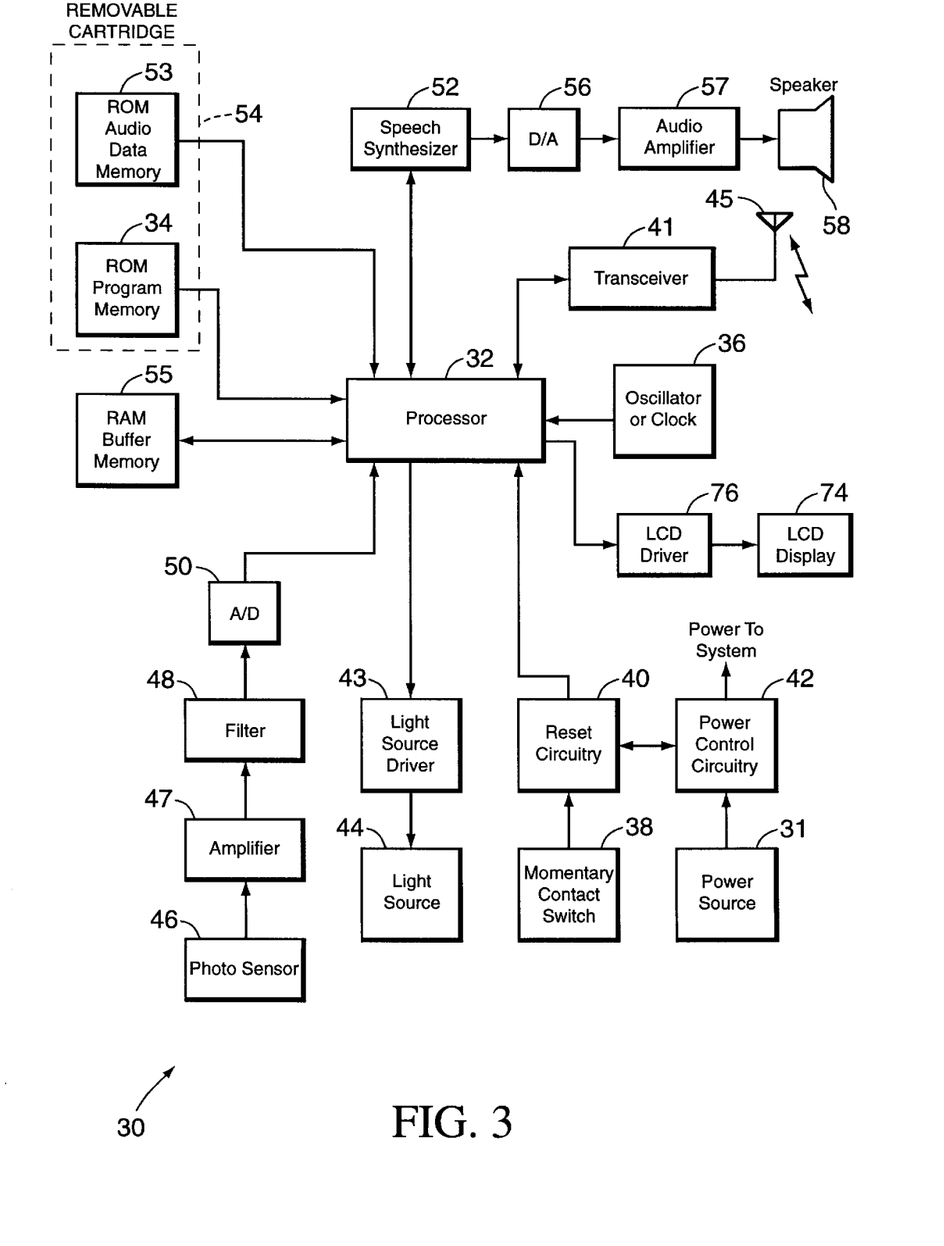
FIG. 3 is a block diagram of an embodiment of an electronic system capable of transducing coded information into select audio sounds.

FIG. 3 shows a block diagram of an electronic system 30 located within a code scanner-reader apparatus 60. (FIG. 4 shows an embodiment of code scanner-reader 60.) In a preferred form, code scanner-reader 60 includes an electro-optical reading system, such as a light pen, a bar code scanner, or an optical character recognition system. However, it should be understood that other scanning-type reading systems, such as a magnetic reading system that includes a magnetic pick-up head capable of scanning magnetic indicia or recordings, can equivalently be substituted for the electro-optical scanning system. Electronic system 30 is powered by a suitable power source 31, such as a battery or other source of electricity. Electronic system 30 includes at least one processor 32, such as the Intel MCS-151 microcontroller, its equivalent, or a more advanced microelectronic controller, microprocessor, or computer, which controls the operations of the various electronic components and connected subsystems. Processor 32 controls and interacts with such electronic components and subsystems according to instructions preprogrammed in a program memory 34, such as a read-only memory, or any other suitable memory storage medium, such as a tape, diskette, CD, or microchip. Synchronization and clocking of the processor 32 can be accomplished by signals derived from an electronic clock or a crystal-controlled oscillator 36.

In a preferred form, a momentary contact switch 38, such as a normally open pressure or limit switch, is provided at the scanning end 62 (see FIG. 4) of code scanner-reader apparatus 60. As the code scanner-reader 60 is used, scanning end 62 contacts the surface to be scanned, such as the page (numbered 6) of book 2, and normally open pressure-actuated switch 38 is closed and activated. Switch 38 activates reset circuit 40 (which can include a one-shot multivibrator to suppress switch bounce or an automatic shut-off delay) when its actuating end is depressed and switch 38 is closed. Reset circuit 40 activates power control circuit 42, which distributes power to the system and resets processor 32 (in conjunction with reset circuit 40) to begin running a program (represented by the flowchart of FIG. 5) from the program memory 34. The program activates a light source driver 43 (See FIG. 4) that provides power to a light source 44, such as a LED, beam generator, or infra-red beam generator. The light source 44 projects light outwardly from a lens 63 at scanning end 62 of housing 64. The light energy is reflected from the surface scanned, with the white or lighter portions of the bar code 4 reflecting more light than the darker portions.

A photosensor 46, such as a photodiode or photoresistor, is provided at scanning end 62 near LED 44. Photosensor 46 receives the reflected light when bar code 4 is scanned. The current output from photosensor 46 is proportional to the light it receives and is processed by an amplifier 47 and filter 48. The signal from amplifier/filter 47, 48 is then digitized, such as by an analog-to-digital converter 50, resulting in a digital signal corresponding to the white and dark portions of the code being scanned.

Processor 32 receives the resulting digital signals. A program (stored in program memory 34) controls processor 32, causing it to process and analyze the information encoded in the data that scanned bar code 4 represents. A synthesizer 52, such as a speech synthesizer, and speech or audio data memory 53 (see FIG. 3) are electrically connected to processor 32. A person skilled in the art will understand that a synthesizer can comprise a processor of some sort, a memory, and an analog-to-digital converter. Thus, audio data memory 53 can be included in synthesizer 52 or can be provided as a separate component such as a separate EEPROM. Processor 32 and digital-to-analog converter 56 may be part of or separate from synthesizer 52.

In one form of the invention, audio data memory 53 is provided as a separate removable cartridge 54, similar to a game cartridge for video games. In this manner, a separate cartridge 54, and thus a different audio data memory 53, can be provided for different books or for use in particular applications. Different cartridges 54 for different books can contain a different sets of audio data, with each data set corresponding to a different sound or set of sounds. Synthesizer 52 or program memory 34 can also be included as part of removable cartridge 54.

In a preferred form, a large number of sets of audio data are included in memory, with each data set corresponding to a particular sound, sound pattern (having meaning by itself), or group of sounds. Examples of such meaningful sound patterns include different words, musical notes, animal noises, special effects noises, different voices of cartoon characters, words in different languages, or phonemes. Each data set may also correspond to a different group of meaningful sounds that collectively have an individual code, such as a group of words, a sentence or phrase, or a sequence of music. By using a multitude of sets of audio data, with each set corresponding to a different meaningful sound or group of sounds, the present invention can transduce coded information into a greater variety of audible information that is meaningful and readily intelligible to the user. This enables a person to use the reader device and understand the audio output without having to acquire any special skills.

After processor 32 analyzes the specific coded information that the scanned code represents, it selects appropriate speech or audio data from the audio data memory 53 and transmits such audio data to the synthesizer 52 or to buffer memory 55 (such as a high-speed RAM) for temporary storage. Synthesizer 52 reads the digital signals (either directly or from buffer memory), and the digital signals are then converted to an analog signal by a digital-to-analog converter 56. The analog signal is then amplified by an audio amplifier 57 and applied to a speaker 58 to generate the selected sounds, such as speech or music.

It should be understood that synthesizer 52 can be any suitable sound signal generator and preferably includes a buffer memory. The synthesizer can also be a program in program memory 34 that is run by processor 32. In an alternate embodiment, a buffer memory can be provided separate from the synthesizer. In a preferred form, synthesizer 52 or buffer memory 55 can form part of a common chip containing other of the described electronic components of the system, to enable all the components to be easily supported within housing 64 of code scanner-reader 60 (FIG. 4).

FIG. 4 shows a preferred embodiment of code scanner-reader 60, with a scanning end 62 and speaker end 66. Code scanner-reader 60 has a housing 64 that is preferably elongated and can be substantially tubular in shape, similar to a fat ink marker or "highlighter." The size and shape allows small children to easily hold and manipulate reader 60. It should be understood that tubular does not require that the housing have a circular cross-section. The cross-section of the tubular housing could approximate an oval, a square, a polygon or any other suitable shape. In one form, the cross-section of the tubular housing may approximate a triangle to allow the housing to be easily gripped and manipulated by small children. The use of a substantially triangular cross-section provides three substantially flat surfaces. A child can use his thumb and forefinger to grip two of the flat surfaces while the third flat surface is easily supported by the middle finger. The term elongated means having a measurement in one dimension of a three-dimensional object significantly longer than the measurement in the other two dimensions.

The light source 44 and photosensor 46 are located at scanning end 62 of housing 64. An audio output, such as speaker 58 is located near speaker end 66 of housing 64 such that the speaker 58 is positioned as close as possible to, and in any event within hearing distance of, an ear of the person using the device when the user holds housing 64 during the act of scanning.

In a preferred form of the invention, all of the electrical components and systems shown in FIG. 3 are located within housing 64 of FIG. 4. A contact switch 38, such as a normally open pressure or limit switch, is preferably located near or at scanning end 62 of housing 64 and is configured to interact with a surface such as a printed page or the surfaces defined by guide 8 and cut-out 12. FIG. 4 shows a flange or shelf 39, such as a circular actuator of switch 38, surrounding housing 64 near scanning end 62. Scanning end 62 mates with cut-out 12 and may contact the surface being scanned. Edges 14, defining cut-out 12 of guide 8, contact and move normally open switch 38 towards speaker end 66 when scanning end 62 is pushed towards the page exposed by cut-out 12. This movement of normally open switch 38 activates reset circuitry 40, as discussed previously. Alternatively, switch 38 can be designed so that pressing end 62 against page 6, instead of guide 8, can cause closure of switch 38.

In another embodiment, switch 38 may be configured to be manually closed when the housing 64 is gripped in the normal course of operating the reader device 60. For example, a membrane-type switch can be positioned on a portion of the surface of housing 64 that is normally gripped to automatically activate reader device 60 when it is being used. The details of such membrane switches will not be discussed since membrane switches are well known and are used in common devices such as calculators, photocopiers, and printers. Various types of membrane switches are readily available from companies such as Molex Incorporated, of Lisle, Ill.

In a modified form of the invention, speaker 58 can be removably attached at speaker end 64 of housing 66 and connected to the electronic circuitry therein by a pair of wires or a cable. This permits speaker 58 to be brought next to an ear of the user. A fitting or hook made from a suitable material, such as plastic, can also be connected to the speaker to permit it to be held over, against or next to the ear so that the user can listen to the audio without disturbing others in the room. In another embodiment, a pair of headphones or an earphone can be plugged into an audio output, such as audio jack 68.

In another modification, an electronic display, such as a LCD or a LED character or graphic display 74 is provided.

The electronic display can form part of or be coupled to housing 64, such as at or near speaker end 66. In an alternative form, the character display can be included on a support that is coupled to housing 64. The support can be fixedly, pivotally, rotationally, hingedly, or otherwise coupled to housing 64. The character display is electronically coupled to processor 32 through display driver 76 and is operable to display the information defined by the indicia being scanned. The person operating such an embodiment of reader 60 will therefore have two intelligible indicating systems, one providing audible playback and the other providing a visual display of the information.

In another embodiment, as the printed indicia are scanned, the data that correspond to the scannable indicia are directly transmitted to a remote location via radio or other wireless transmission. The data can be transmitted to a cash register, computer, or other device at a location remote from reader 60 using a transceiver 41 and antenna 45 (shown in FIG. 3) that is coupled to the reader or light pen. Alternatively, a wire can be used to transmit the data to a remote location.

In another example, code scanner-reader 60 is used as a data verification system at a point of purchase. This modification is useful in department stores to prevent the switching of sales tags between items. Because the present invention produces meaningful sounds, instead of just beeps or other simple sounds, more information can be provided to the user than previous hand-held devices allowed. When the codes are scanned, code scanner-reader 60 transduces the coded information into readily understandable audible information such as type of item, price, size, color, or brand. The salesperson can then verify that the audible description corresponds with the item purchased. Also, when the apparatus includes the transceiver shown in the previous embodiment, the scanned data can be either immediately transmitted to a remote location, such as a cash register, or can be stored until the salesclerk verifies that the item and audible description match.

In another embodiment, the scanned code corresponds to a sentence, word, or page of text of a child's book. When the child scans a code printed on the page with code scanner-reader 60, such as using guide 8, speaker 58 "reads" the audio data so identified to the child.

In yet another embodiment, the code scanner-reader device 60 is used as a pocket translator. A book or pamphlet is provided that has words printed in a language that is foreign to the user. The code scanner-reader is used to scan the printed words (using known optical character recognition methods) or a bar code located near the printed words, and the scanned data are transduced to selected sounds of a language understood by the user. Separate removable cartridges 54 can be provided for audibly translating different printed languages. In one form, an optical character recognition device is provided that scans the written characters of one language and provides an audible translation in another language. Alternatively, an international standard coded information for travelers can be implemented. The international codes can then be printed on any document, sign, etc. and then translated into any language using the invention. The adoption of an international code would have the added advantage of enabling travelers to use the code scanner-reader 60 in any country with only one separate cartridge (the one for the traveler's home language). For example, a menu in France can have the French word for coffee printed on it and also have the international code for coffee printed on it. An traveler who cannot read French could then use his own personal code scanner-reader device to scan the menu and translate the international code for coffee to a native language.

Figure 5:
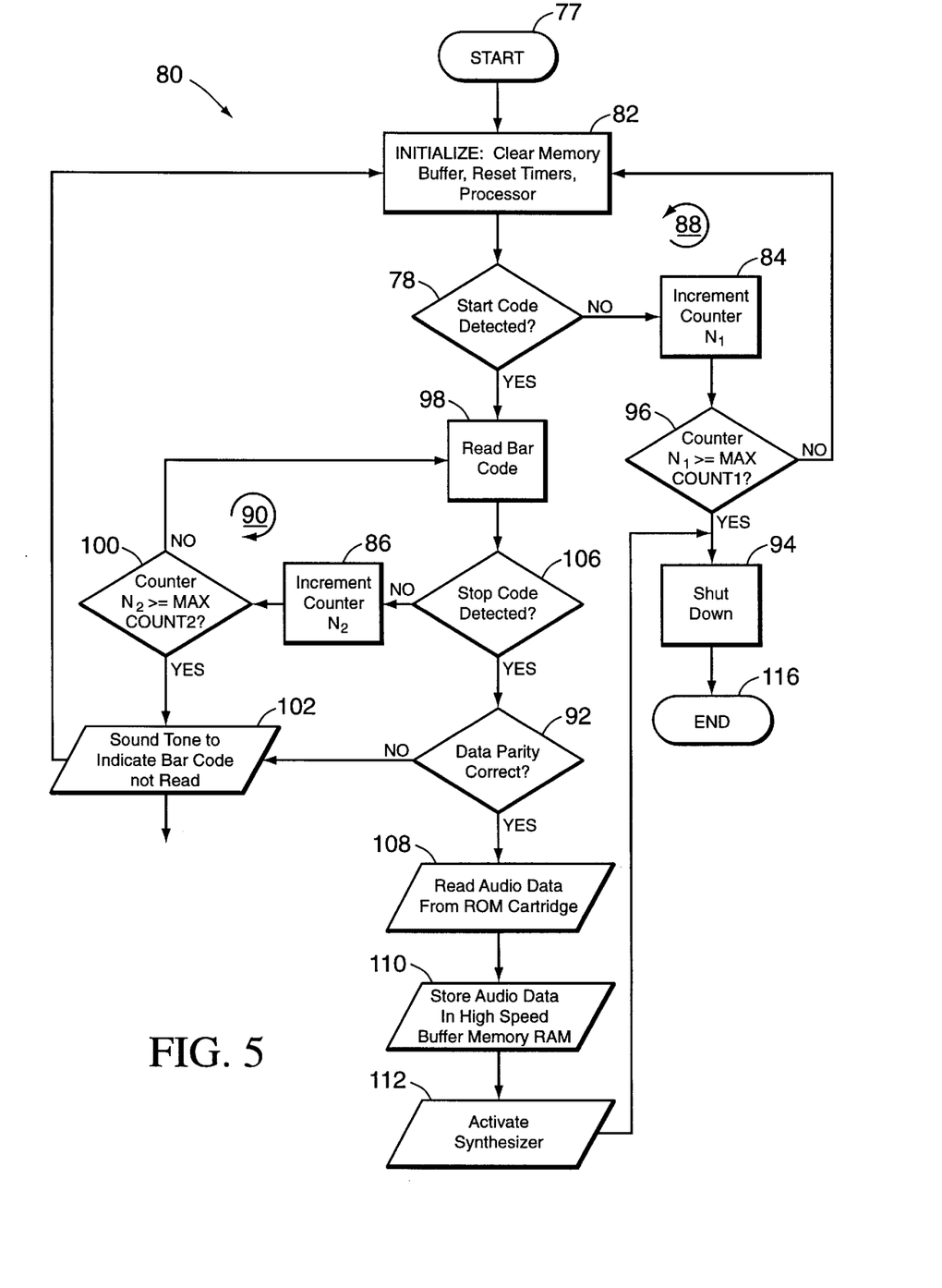
FIG. 5 is a flowchart showing steps in the operation of the electronic system of FIG. 3.

FIG. 5 illustrates a general logic flowchart for one embodiment of the invention. The flowchart shows control algorithm 80, which represents an example of a program stored in program memory 34 of FIG. 3. Code scanner-reader 60 transduces the scanned indicia to sounds of speech or music in the following manner: The program 80 is activated (77) after momentary contact switch 38 is pressed. An initialization sequence 82 is started, which can include clearing the buffer memory 55 and resetting increment counters 84 and 86. Increment counters 84 and 86 count the number of times ($N_1$ and $N_2$) the program runs through loop 88 or 90 of the control algorithm 80. The code scanner-reader 60 is shut down at block 94 and the program terminates (116) when the program (96) determines that loop 88 has been executed a predetermined number of times ($N_1$) without detecting any coded information that is to be scanned. This automatic shutdown procedure conserves power source 31 and acts as a safety device, preventing a child from staring at light source 44 for a long period of time.

If a code is detected, program 80 reads, decodes, and stores the coded information at block 98 and in loop 90. To prevent a partial scan of the coded information, if decision block 100 determines that a stop code for the coded information has not been detected within a certain number ($N_2$) of loops through loop 90 (see counter 86), then a tone sounds (102) and the program restarts/repeats. When a stop code is detected (decision block 106), a data parity check 92 is run, and if the data are valid, then audio data are read from speech memory 53 (block 108) and stored in buffer memory 55 (block 110), and synthesizer 52 is activated (block 112). After speech signals have been sent to speaker 58, the program shuts down (block 94).

Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase.

Likewise, the use of the word "function" in the specification is not intended to invoke the provisions of 35 U.S.C. § 112, ¶6 to define the invention. To the contrary, that paragraph will be considered to define a claimed element of the invention, only if the phrases "means for" or "step for" and a function, without also reciting in that element any structure, material, or act in support of the function, are specifically recited in that element. Moreover, even if the provisions of 35 U.S.C. § 112, ¶6 are invoked to define the invention, patentee intends that the invention not be limited to the specific structure, material, or acts that are described in the preferred embodiments. Rather, "means for" or "step for" elements are nonetheless intended to cover and include within their scope any and all known or later-developed structures, materials, or acts that perform the claimed function, along with any and all equivalents.

It is understood by those skilled in the art that numerous other alternate forms and embodiments of the invention can be devised without departing from its spirit and scope, which are defined in the claims that follow.

I claim:

1. A self-contained, hand-held system for reading coded data and transducing the coded data to selected sounds, the system comprising:

(a) an elongated, substantially tubular housing;

(b) a code scanner-reader supported by the housing and having an output for signals identifying selected sounds;

(c) a synthesizer supported by the housing, electrically coupled to the output of the code scanner-reader, and comprising:
  (i) a memory holding a multitude of sets of data, each set corresponding to at least one different selected sound; and
  (ii) a processor coupled to the memory and structured to select from the memory the set of data that corresponds to the signals on the output of the code scanner-reader;
(d) an audio output supported by the housing and electrically coupled to the synthesizer;
(f) a power source supported by the housing and coupled to the code scanner-reader and the synthesizer; and
(g) a contact switch located on the surface of the housing and structured to activate the code scanner-reader when the housing is gripped.

2. The system of claim 1 further comprising a removable cartridge supported by the housing, and wherein the cartridge comprises the memory.

3. The system of claim 2 wherein the removable cartridge further comprises the processor.

4. The system of claim 1 further comprising a guide positioned across the coded data.

5. The system of claim 4 wherein the guide is attached to a book.

6. The system of claim 5 wherein the guide is hingedly attached to the book.

7. The system of claim 1 further comprising an automatic power shutdown system structured to turn off the code scanner-reader when no coded data have been scanned in a given time period.

8. The system of claim 1 wherein the substantially tubular housing has a substantially triangular cross-section.

9. The system of claim 8 wherein the selected sound is a sound of speech.

10. The system of claim 9 wherein the sound of speech is at least one phoneme.

11. The system of claim 1 further comprising an electronic display affixed to the housing.

12. The system of claim 1 wherein the code scanner-reader device includes an electro-optical code scanner.

13. The system of claim 12 wherein the electro-optical code scanner comprises a bar code scanner.

14. The system of claim 12 wherein the electro-optical code scanner comprises an optical character recognition system.

15. The system of claim 1 wherein the processor comprises a microprocessor.

16. The system of claim 1 wherein the audio output comprises an audio jack.

17. The system of claim 1 wherein the audio output comprises a speaker.

18. The system of claim 1 wherein the synthesizer comprises an integrated memory and processor.

19. The system of claim 1 wherein the contact switch is a membrane switch.

20. A self-contained, hand-held system for reading coded data and transducing the coded data to selected sounds, the system comprising:
  (a) an elongated substantially tubular housing;
  (b) a code scanner-reader supported by the housing and having an output for signals identifying selected sounds;
  (c) a synthesizer supported by the housing, electrically coupled to the output of the code scanner-reader, and comprising:
    (i) a memory holding a multitude of sets of data, each set corresponding to at least one different selected sound; and
    (ii) a processor coupled to the memory and structured to select from the memory the set of data that corresponds to the signals on the output of the code scanner-reader;
  (d) an audio output supported by the housing and electrically coupled to the synthesizer:
  (f) a power source supported by the housing and coupled to the code scanner-reader and the synthesizer;
  (g) a contact switch supported by the housing; and
  (h) a guide attached to a book and positioned across coded data in the book;
  (i) wherein the contact switch and the guide are configured to interact with one another to activate the code scanner-reader when the contact switch contacts the surface guide.

21. The system of claim 20 further comprising a removable cartridge supported by the housing, and wherein the cartridge comprises the memory.

22. The system of claim 21 wherein the removable cartridge further comprises the processor.

23. The system of claim 20 wherein the guide is hingedly attached to the book.

24. The system of claim 20 further comprising an automatic power shutdown system structured to turn off the code scanner-reader when no coded data have been scanned in a-given time period.

25. The system of claim 20 wherein the substantially tubular housing has a substantially triangular cross-section.

26. The system of claim 20 wherein the selected sound is a sound of speech.

27. The system of claim 26 wherein the sound of speech is at least one phoneme.

28. The system of claim 8 further comprising an electronic display affixed to the housing.

29. The system of claim 20 wherein the code scanner-reader device includes an electro-optical code scanner.

30. The system of claim 29 wherein the electro-optical code scanner comprises a bar code scanner.

31. The system of claim 29 wherein the electro-optical code scanner comprises an optical character recognition system.

32. The system of claim 20 wherein the processor comprises a microprocessor.

33. The system of claim 20 wherein the audio output comprises an audio jack.

34. The system of claim 20 wherein the audio output comprises a speaker.

35. The system of claim 20 wherein the synthesizer comprises an integrated memory and processor.

36. A self-contained, hand-held system for reading coded data and transducing the coded data to selected sounds, the system comprising the following elements, all supported by an elongated, substantially tubular housing:
  (a) means for scanning and reading coded data and producing therefrom digital signals identifying the scanned, coded data;
  (b) means for transducing the digital signals into selected sounds comprising:
    (i) means for storing a multitude of sets of audio data, each set corresponding to at least one different selected sound;
    (ii) means for selecting a set of audio data corresponding to the digital signals produced by said means for scanning and reading coded data; and (iii) means for converting the selected set of audio data to audible form; and (c) means for automatically activating the system when the scanning and reading means is placed in a predetermined position.

37. The system of claim 36 further comprising means for deactivating the system when the system has not scanned coded data in a predetermined period of time.

38. The system of claim 37 further comprising means for guiding the scanning and reading means.

39. A method for reading scannable indicia and transducing the indicia into selected sounds, the method comprising:

(a) activating an elongated, substantially tubular, hand-held code scanner-reader containing a memory by gripping a surface of the scanner-reader;

(b) using the scanner-reader to scan printed indicia and produce code signals that identify the printed indicia;

(c) using the code signals to read from memory a selected one of a multitude of sets of data prestored in the memory, each set identifying a distinct sound pattern; and (d) converting the selected set of data read from the memory into audible sounds corresponding to the sound pattern identified by the selected set of data.

40. A method in accordance with claim 39 wherein the memory is provided as part of a removable cartridge.

41. A method in accordance with claim 40 further comprising selecting a removable cartridge that is appropriate for the printed indicia.

42. A method in accordance with claim 39 wherein the printed indicia comprise printed characters of a first language and the audible sounds comprise sounds of speech of a second language that is different from the first language.

43. A method in accordance with claim 39 further comprising providing a guide, positioning the guide across the coded data, and scanning the printed indicia by following the guide with the code scanner-reader.

44. The method of claim 39 further comprising automatically deactivating the hand-held scanner-reader when no indicia have been scanned in a given time period.

45. A method for reading scannable indicia and transducing the indicia into selected sounds, the method comprising:

(a) providing a guide:

(b) positioning the guide across printed indicia;

(c) activating an elongated substantially tubular, hand-held code scanner-reader containing a memory by pressing a switch, located on the hand-held scanner-reader, against the guide;

(d) scanning the printed indicia by causing the code scanner-reader to follow the guide and thereby to produce code signals that identify the printed indicia:

(e) using the code signals to read from memory a selected one of a multitude of sets of data prestored in the memory, each set identifying a distinct sound pattern; and (f) converting the selected set of data read from the memory into audible sounds corresponding to the sound pattern identified by the selected set of data.

46. A method in accordance with claim 45 wherein the memory is provided as part of a removable cartridge.

47. A method in accordance with claim 46 further comprising selecting a removable cartridge that is appropriate for the printed indicia.

48. A method in accordance with claim 45 wherein the printed indicia comprise printed characters of a first language and the audible sounds comprise sounds of speech of a second language that is different from the first language.

49. The method of claim 45 further comprising automatically deactivating the hand-held scanner-reader when no indicia have been scanned in a given time period.

* * * * *